3 Sheets—Sheet 1.

O. M. MORSE.

SEPARATING MACHINE.

No. 11,507. Reissued Sept. 10, 1895.

Witnesses:
O. F. Barthel,
M. E. Doherty.

Inventor:
Orville M. Morse,
By M. E. Prager & Son
Atty's.

O. M. MORSE.

SEPARATING MACHINE.

No. 11,507. Reissued Sept. 10, 1895.

Witnesses:
C. F. Barrett
J. M. McDogherty

Inventor:
Orville M. Morse,
By Thos. S. Sprague & Co.
Attorneys.

3 Sheets—Sheet 3.

O. M. MORSE.

SEPARATING MACHINE.

No. 11,507. Reissued Sept. 10, 1895.

Witnesses:
O. F. Barthel
T. McDougherty

Inventor:
Orville M. Morse,
By Noble & Sprague & Co.
Attorneys.

UNITED STATES PATENT OFFICE

ORVILLE M. MORSE, OF JACKSON, MICHIGAN.

SEPARATING-MACHINE.

SPECIFICATION forming part of Reissued Letters Patent No. 11,507, dated September 10, 1895.

Original No. 499,795, dated June 20, 1893. Application for reissue filed March 26, 1894. Serial No. 505,194.

*To all whom it may concern:*

Be it known that I, ORVILLE M. MORSE, a citizen of the United States, residing at Jackson, in the county of Jackson and State of Michigan, have invented certain new and useful Improvements in Separating-Machines, of which the following is a specification, reference being had to the accompanying drawings.

This invention relates to improvements in the separating-machine for which Letters Patent No. 441,372, dated November 25, 1890, and Reissue No. 11,165, dated May 12, 1891, were granted to me.

The separating-machine of said patent contains a separating-chamber which has an imperforated peripheral wall and an outlet at one end for the heavy material and at the opposite end for the light material and a rotating air-propelling device which is located in the separating-chamber near the outlet for the heavy material and which causes the air to circulate from the axial portion of the chamber to the peripheral wall, thence along the peripheral wall to the opposite end, and thence back through the axial portion of the chamber, so that the circulating air-current moves along the peripheral wall from the outlet for the heavy material to the outlet for the light material, and so carries the dust to the last-named outlet.

The objects of the present invention are to provide the machine with contrivances whereby the grain or other heavy material which is discharged from the separating-chamber is subjected to further air or gravity separations to remove the light material mixed with it and to improve the machine in other respects, so as to render it better available for use as a grain-scourer or smut-machine and for similar uses.

Figure 1:
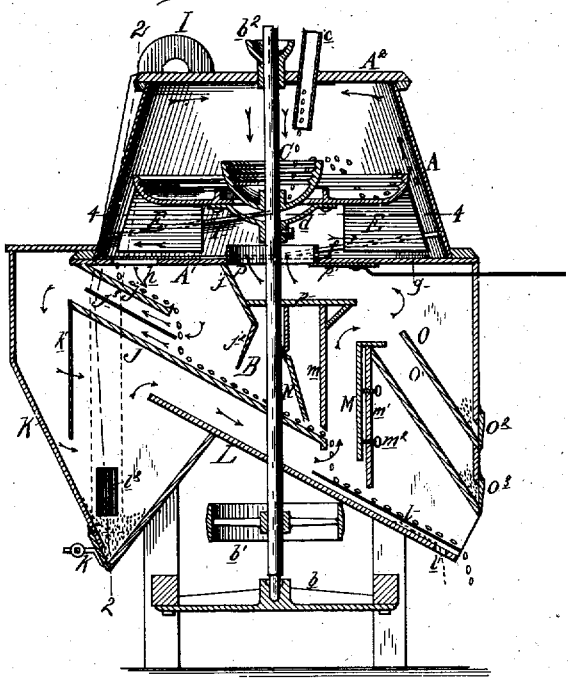
Figure 2:
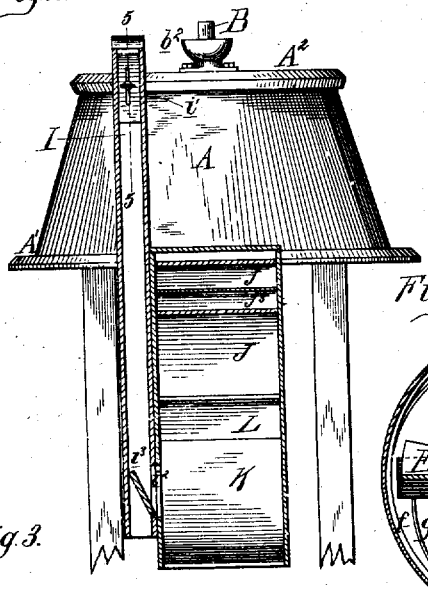
Figure 6:
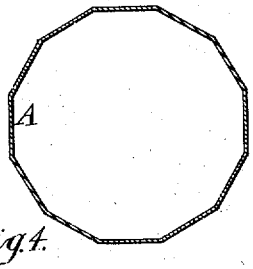
Figure 4:
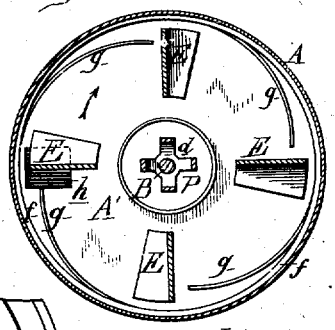
Figure 3:
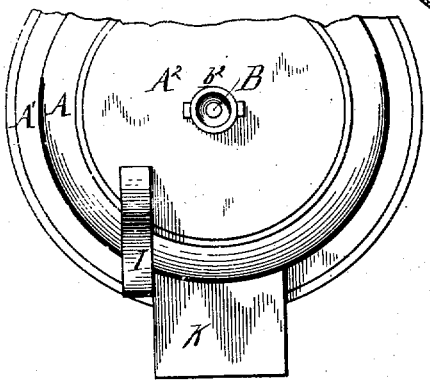
Figure 5:
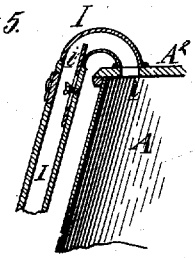
Figures 7, 8:
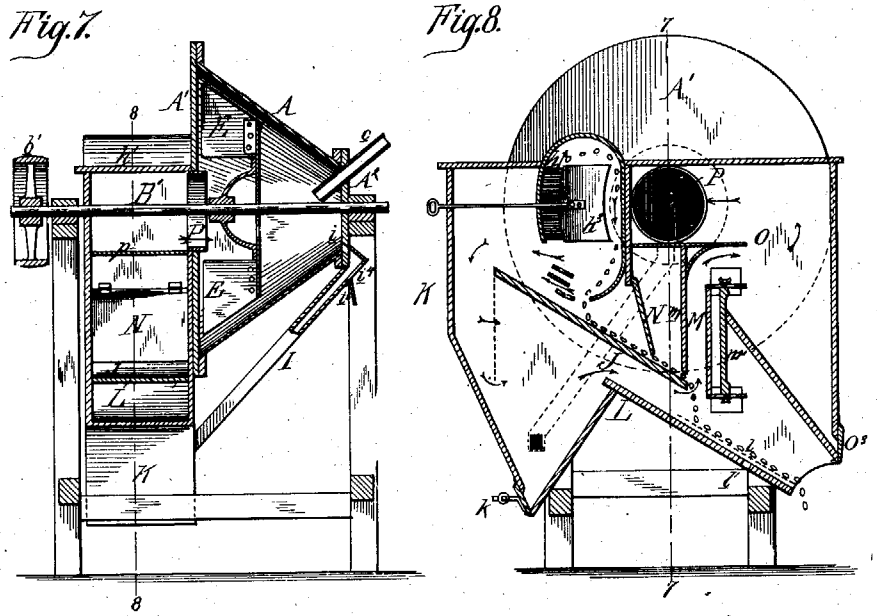

In the accompanying drawings, consisting of three sheets, Figure 1 is a vertical section of an upright grain scouring and separating machine provided with my improvements. Fig. 2 is a side elevation of the machine, partly in section, the section being taken on line 2 2 in Fig. 1. Fig. 3 is a fragmentary top plan view of the machine. Fig. 4 is a horizontal section in line 4 4, Fig. 1. Fig. 5 is a fragmentary vertical section through the upper portion of the scouring-case in line 5 5, Fig. 2. Fig. 6 is a horizontal section showing the peripheral wall of the scouring-case polygonal in form. Fig. 7 is a vertical longitudinal section of a horizontal grain scouring and separating machine provided with my improvements, the plane of the section being taken in line 7 7, Fig. 8. Fig. 8 is a sectional end elevation of this machine, the section being taken in line 8 8, Fig. 7.

Like letters of reference refer to like parts in the several figures.

A represents the peripheral wall of the scouring-chamber, which has preferably the form of a frustum of a cone or pyramid. In the upright machine represented in Figs. 1 to 5 this peripheral wall is secured with its lower large end to a bottom plate A′, which rests upon the stationary frame of the machine, and with its small upper end to a top plate $A^2$.

B represents a vertical shaft arranged axially in the scouring-chamber and extending below the same. The lower end of this shaft is supported by a step-bearing on a bridge-tree *b*, secured to the stationary frame of the machine, and the shaft is provided above the bridge-tree with a driving-pulley *b′*. The upper end of the shaft is supported in a bearing $b^2$, secured to the top plate $A^2$.

*c* represents the feed-pipe through which the grain or other material to be operated upon is introduced into the scouring-case, and which enters the upper portion of the latter, near the center thereof, and delivers the grain into a feed-saucer C, which is secured to the shaft B in the lower portion of the scouring-chamber.

D represents an annular plate arranged horizontally below the feed-saucer and secured to the shaft B below the saucer by a spider *d*. This plate carries on its under side the blades or wings E, by which the air is set in motion within the machine, which are arranged underneath the outer portion of the plate. The interior surfaces of the feed-saucer and annular plate are preferably ribbed or roughened near their edges to increase the scouring action, and the marginal portion of the annular plate is preferably turned upwardly to hold the grain longer on the plate. The blades are preferably inclined or curved in the direction in which they rotate for the purpose of lifting the grain in the scouring-chamber and retarding its escape therefrom.

The peripheral wall A is preferably provided on the inner side of its lower portion with spiral flanges *f*, which are inclined upwardly in the direction in which the wings E rotate, which direction is indicated by the arrow in Fig. 4. These inclined flanges or deflectors also operate to elevate the grain and retard its escape from the scouring-case, and they serve the further purpose of turning the grain over as it rolls over the edges of these flanges, and so increase the scouring action. The bottom plate A′ is preferably provided on its upper side with spiral ribs or flanges *g*, which extend from the peripheral wall inwardly in the direction in which the blades rotate, as shown in Fig. 4, and which move the grain toward the axis of the scouring-chamber, and so retard its escape therefrom, and which also turn the grain over as the kernels roll over these flanges at their upper edges and at their inner ends.

*h* represents the opening for the discharge of the grain formed in the bottom plate A′ near the peripheral wall of the scouring-chamber. *i* represents the opening formed in the top plate $A^2$ near the peripheral wall of the scouring-chamber for the escape of the smut or other light dust. This opening connects with a dust-spout I, extending downwardly on the outer side of the scouring-chamber and preferably provided in its upper portion with an adjustable internal gate *i′*, by which the flow of the dust through the spout can be regulated. The grain which is discharged through the opening *h* is accompanied by an air-current composed of part of the air which is set in motion by the rotating blades in the scouring-chamber. The plump grain is first separated from this air-current, and the chaff, chess, shrunken grains, &c., which are carried on the air-current, are separated therefrom, and the plump grain is subjected to a further air separation in an air or gravity separator, into which the grain and air-current pass from the scouring-chamber, and which is constructed as follows: *j* is an inclined plate or board arranged underneath the grain-discharge opening *h* and inclined toward the center of the machine and forming the outer and lower wall of an air-passage, the inner wall of which is formed by a plate *j′*, carrying at its lower end an adjustable valve $j^2$. The plate *j′* and the valve $j^2$ are arranged near the shaft B of the machine, and the valve $j^2$ is provided with a stem extending through the casing of the machine and provided outside of the casing with a hand-lever and fastening, by which the valve is adjusted and secured in position, as is usual in grain-cleaning machines. The board *j* forms at the same time the top of an air-passage, through which the air flows outwardly, and whose bottom is formed by an inclined board J, arranged underneath the board *j* and parallel therewith and extending inwardly beyond the shaft B. The air-passage between the boards *j* and J may be divided into two parts, one arranged above the other, by an inclined board $j^3$.

K represents the chaff-hopper, which is arranged outside of and below the board J, and which receives at its upper end the air-current flowing outwardly through the passage between the boards *j* and J, and which is made of such size that the air-current expands sufficiently to part with the chaff, which is discharged from this hopper by a valve *k*.

L represents an inclined board which is arranged below the inclined board J and which extends with its upper end into the chaff-hopper K and has its lower end arranged at the opposite side of the machine. The boards J and L form the top and bottom of an air-passage through which the air flows from the chaff-hopper to the opposite side of the machine. At the inner end of the board J is arranged an ascending air-passage, the inner and outer walls of which are formed by boards *m* and *m′*. The latter extends downwardly below the board J and toward the board L, above which it is arranged, while the board *m* is arranged above the lower end of the board J.

M is an adjustable upright board arranged on the inner side of the outer wall *m′* of this ascending air-passage and made adjustable toward and from the opposite vertical wall by screws $m^2$ or other suitable means, so that the size of this air-passage can be regulated. The casing of the machine is provided with covered hand-holes of well-known construction opposite the screws $m^2$, through which holes access can be had to the screws when required.

N represents a flap-valve which is arranged over the lower portion of the inclined board J and which rests loosely upon the grain flowing over said board and prevents any considerable volume of air from passing downwardly with said grain.

O represents the chess-hopper, which communicates with the upper end of the ascending air-passage formed between the boards *m* *m′* and in which the chess, broken grain, &c., are deposited. This chess-hopper may be divided into two parts by an inclined partition O′ when it is desired to separate the deposited materials into two grades, and in this case the two grades of material are discharged from the hopper by two valves $O^2$ $O^3$.

*p* represents a horizontal board which forms the bottom of an air-passage leading from the upper part of the chess-hopper to a central opening P, formed in the bottom A′ of the scouring-chamber. This opening is preferably provided with an adjustable gate *p′* for regulating the air-current passing through the same.

In the operation of this machine upon smutty grain the latter is scoured in the feed-saucer and upon the annular plate below the saucer, upon which latter it is thrown from the saucer, and on the peripheral wall of the scouring-chamber, around which it is driven by the action of the revolving blades, and a separation is made of the detached smut and other fine dust from the grain and coarser impurities, the smut and fine dust being driven by the air-current in the scouring-chamber to and through the dust-outlet at the upper end thereof, while the grain and coarser impurities are discharged through the opening in the bottom plate provided for that purpose. Part of the air which is set in motion by the rotating blades escapes from the scouring-chamber with the grain and coarser impurities. The plump grain is separated from this air-current at the lower end of the inclined plate $j$, where the grain drops through the air-current and descends over the inclined plate J, while the air-current reverses its direction and passes upwardly and outwardly to the top of the chaff-hopper. The heavier grade of the coarse impurities carried on the air-current is deposited in this hopper, and the air-current, still carrying the lighter grade of these coarse impurities, moves on inwardly and downwardly until it reaches the end of the inclined board J, where it assumes an upward direction and passes through the descending plump grain, which escapes over the inclined plane of the board J, and separates from the grain any light impurities which may be mixed with it. The air-current now passes through the chess-hopper, where the light impurities carried on the air are deposited, and finally returns to the interior of the scouring-chamber through the central opening in the bottom thereof. The air is thus kept in circulation through the scouring-chamber and the air-separator, and the escape of the dust-laden air into the mill is thereby prevented, although the discharge through which the plump grain escapes at the lower end of the inclined board L may be opened to the atmosphere. The lower portion of the dust-spout is arranged on one side of the chaff-hopper K and communicates with the latter by an opening $i^2$, provided with a valve $i^3$, so that the dust can be directed from the dust-spout into the chaff-hopper by placing the valve obliquely across the dust-spout, as shown in Fig. 2, or can be discharged separately by closing the opening in the side of the chaff-hopper. The chaff-hopper may be provided with a partition $k'$, depending from the upper end of the inclined board J, for the purpose of giving the air-current first a descending and then an ascending direction in the hopper, and this partition may be perforated, as shown in Fig. 1, for the purpose of allowing part of the air to pass through it in a more direct course. A screen $l$ may be arranged at a short distance above the lower portion of the inclined plate L and below the ascending air-passage at the lower end of the inclined plate J, as shown in Fig. 1, so that the grain escaping from the lower end of the inclined plate J falls upon it and escapes over the lower end thereof, while any fine impurities still contained in the grain will pass through the screen and escape through an opening $l'$ in the lower portion of the plate L, together with impurities which may reach this opening from the upper portion of the inclined plate L.

Instead of making the peripheral wall of the scouring-chamber circular in cross-section, as shown in Fig. 4, it may be polygonal in form, as shown in Fig. 6.

The horizontal grain scourer and separator represented in Figs. 7 and 8 is composed of the same scouring and dust-separating mechanism and the same gravity or air separator which are employed in the upright machine; but the scouring and dust-separating mechanism is arranged with its axis horizontally and on one side of the gravity-separator instead of being arranged perpendicularly and above the gravity-separator, as in the upright machine. In this horizontal machine the feed-spout $c$ delivers the grain directly upon the peripheral wall of the scouring-chamber, from which it is discharged, after it has been scoured and the dust has been separated from it, through the opening $h$ in the large head A′ of the scouring-chamber. This opening is inclosed by a hood $h'$, which confines the grain and the air escaping with it from the opening $h$. The wings run in an upward direction on that side of the machine and the grain and air are discharged in an upward direction. The hood therefore extends beyond the upper, inner, and lower sides of said opening, but can be arranged closely against the outer side of said opening. The hood $h'$ is provided at its lower end with an opening $h^2$, through which the grain escapes, while the air-current, carrying the coarse impurities in suspension, passes upwardly to the upper end of the chaff-hopper. After depositing the chaff in the same the air-current passes through the descending stream of plump grain and ascends to the chess-hopper, and finally returns to the interior of the scouring-chamber through the opening P. The several parts of the gravity-separator are constructed and operate substantially like those of the gravity-separator of the upright machine. The grain-discharge opening $h$ may be provided with a gate $h^3$ for regulating the discharge of the grain and air therefrom.

The dust-spout I, which leads from the dust-outlet $i$ at the small end of the scouring-chamber to the chaff-hopper, is provided in its bottom with an opening $i^4$, provided with a valve $i^5$. Upon opening this valve the dust can be discharged from this spout through that opening, while by closing the valve the dust is sent to the chaff-hopper.

The shaft B′ of the horizontal machine is arranged horizontally and carries the driving-pulley $b'$ at one end.

I claim as my invention—

1. The combination with the scouring and dust separating chamber having a dust outlet at one end, an outlet for grain and air at the other end and an internal air propelling device, of a chamber which is connected with the grain outlet and in which the grain is separated from the air current, and a return passage whereby the air current is conducted back to the scouring chamber, substantially as described.

2. The combination with the scouring and dust separating chamber having a dust outlet at one end, an outlet for grain and air at the other end and an internal air propelling device, of a chamber which is connected with the grain outlet and in which the grain is separated from the air current, a hopper through which the air current passes after having left the grain and in which the heavy impurities are deposited, and a return air passage leading to the scouring chamber, substantially as set forth.

3. The combination with the scouring and dust separating chamber having a dust outlet at one end, an outlet for the grain and air at the other end and an internal air propelling device, of a chamber which is connected with the grain outlet and in which the grain is separated from the air current, a hopper through which the air current passes after having left the grain and in which the heavy impurities are deposited, an ascending air passage leading to a secondary hopper in which the light impurities are deposited, and a return air passage leading to the scouring chamber, substantially as set forth.

4. The combination with the scouring and dust separating chamber having a dust outlet at one end, an outlet for grain and air at the other end, and an internal air propelling device, of a chamber which is connected with said grain outlet and in which the grain is separated from the air current, a chamber in which the grain is afterward caused to descend through the same air current, and a return air passage leading to the scouring chamber, substantially as set forth.

5. The combination with the scouring and dust separating chamber having a dust outlet at one end, an outlet for grain and air at the other end, and an internal air propelling device, of a chamber which is connected with said grain outlet and in which the grain is separated from the air current, a hopper in which the air current drops the heavy impurities, a chamber in which the grain is caused to descend through the same air current after the latter has passed through said hopper, and a return air passage leading to the scouring chamber, substantially as set forth.

6. The combination with the scouring and dust separating chamber having a dust outlet at one end, an outlet for grain and air at the other end and an internal air propelling device, of a chamber which is connected with said grain outlet and in which the grain is separated from the air current, a hopper in which the air current drops the heavy impurities, a chamber in which the grain is caused to descend through the same air current after the latter has passed through said hopper, a hopper in which the air current drops the light impurities, and a return air passage leading to the scouring chamber, substantially as set forth.

7. The combination with the scouring and dust separating chamber having a dust outlet at its upper end, an outlet for grain and air at its lower end and an internal air propelling device, of a gravity separator arranged underneath said scouring mechanism and composed of a chamber arranged underneath the grain outlet, in which the grain is separated from the air current, a chaff hopper arranged underneath said chamber, an inclined grain passage leading from said chamber an air passage leading from said hopper and intersecting said grain passage, a secondary hopper arranged above said grain passage on the opposite side of the machine, and a return air passage leading to the scouring chamber, substantially as set forth.

8. The combination with the scouring and dust separating chamber having a dust outlet at one end, an outlet for grain and air at the other end, and an internal air propelling device, of a chamber which is connected with said grain outlet and in which the grain is separated from the air current, a grain passage leading from said chamber an air passage also leading from said chamber and intersecting said grain passage, and a return air passage leading to the scouring chamber, substantially as set forth.

9. The combination with the scouring and dust separating chamber having a dust outlet at one end, a grain outlet at the other end and an internal air propelling device, of ribs or deflectors arranged on the inner side of the peripheral wall of the scouring chamber opposite the air propelling device and inclined to deflect the grain from the grain outlet toward the dust outlet, substantially as set forth.

10. The combination with the scouring and dust separating chamber having a dust outlet at one end, a grain outlet at the other end and an internal air propelling device, of ribs arranged on the head of the chamber adjacent to the grain outlet and extending from the periphery toward the center of the head in the direction in which the air propelling device rotates, substantially as set forth.

11. The combination with the scouring and dust separating chamber having a dust outlet at one end, an outlet for grain and air at the other end and an internal air propelling device, of a gravity separator connected with the grain outlet and having a hopper in which the impurities are deposited and a return passage, and a dust spout connecting said dust outlet with said hopper and provided with a valve which can be adjusted to deliver the dust into said hopper or discharge it outside thereof, substantially as set forth.

12. In a grain separator, the combination with the casing, of a dust separating and air circulating fan, an endless air passage to and from the fan, separating means in the passage, and oppositely arranged dust and air outlets from the fan and an air inlet opposite the dust outlet, substantially as described.

13. The combination of a casing, having an endless air passage therein, separating means in the passage, a tapering fan casing in the air circuit, having an axial air inlet and an air outlet connecting into the air circuit, an oppositely arranged dust outlet, and a fan in the casing, substantially as described.

14. In a grain separator, the combination with a casing, of a combined scouring and dust separating chamber, an endless air passage leading to and from the chamber, separating means in the passage, a separate dust passage from the chamber, an air circulating and dust separating fan in the chamber, and scouring means in the chamber, substantially as described.

In testimony whereof I affix my signature in the presence of two witnesses.

ORVILLE M. MORSE.

Witnesses:
S. G. MORSE,
JNO. G. MUNDY.